March 9, 1965   H. E. JACKSON ETAL   3,172,427
FLEXIBLE AND SEMI-FLEXIBLE TUBULAR CONDUITS
Filed Oct. 29, 1958
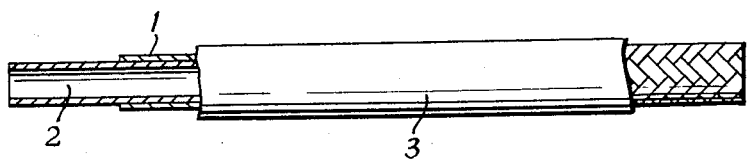
INVENTORS
Harold Ernest Jackson and
Trevor Frederick Moss
BY
ATTORNEY

United States Patent Office 3,172,427
Patented Mar. 9, 1965

3,172,427
FLEXIBLE AND SEMI-FLEXIBLE TUBULAR
CONDUITS
Harold Ernest Jackson, Plympton St. Maurice, and Trevor
Frederick Moss, Newton Ferrers, England, assignors, by
mesne assignments, to Imperial-Eastman Corporation,
Chicago, Ill., a corporation of Illinois
Filed Oct. 29, 1958, Ser. No. 770,466
Claims priority, application Great Britain, Oct. 30, 1957,
33,917/57
2 Claims. (Cl. 138—125)

This invention relates to improvements in flexible and semi-flexible tubular conduits such as are employed for the conveyance of liquids and gases.

Nylon material has previously been found to be satisfactory for forming such conduits since it can readily be extruded and has certain properties which render it very convenient in use. Among these properties, mention may be made of its flexibility, great resistance without being subject to bursting pressures, extremes of heat and cold and to adverse chemical action, while attached to end couplings of the compressible grip-type such as, for example, are described in our British specification No. 26,886/57. The nylon shows in a high degree the qualities of resistance to compression which might damage the ends of the pipe or tube and resistance to cold flow which might result in a faulty fluid seal with the coupling.

On the other hand, nylon does suffer from certain disadvantages. One of these is that, in one type, it is adversely affected by the action of ultraviolet rays, such as are present in sunlight, for example. Another is that conduits made of this material are somewhat adversely affected by the prolonged action of moisture.

The principal object of the present invention is to provide a tubular conduit which will enable the above mentioned advantages to be put to good effect, while the disadvantages are mitigated.

According to the invention, we provide a flexible or semi-flexible tubular conduit comprising an inner extruded nylon pipe or tube, a layer of filaments of the material commonly known by the registered trademark "Terylene" surrounding the nylon pipe or tube and an outer extruded sleeve of heat and light-stabilized synthetic plastic material surrounding the Terylene layer.

Neoprene is a suitable material for making the outer extruded sleeve of heat and light-stabilized synthetic plastic material.

As an example of the manner in which our invention may be carried into effect, reference is made to the accompanying drawing which shows, by way of example, one form of conduit constructed in accordance with the invention.

A layer of Terylene filaments is provided around an inner nylon tube 2 by braiding in known manner, so as to form a braided sleeve. Terylene, which is made by condensing ethylene glycol with terephthalic acid, is a material which retains its strength either wet or dry and Terylene fibers have qualities superior to other fibers in their resistance to mineral or organic acids, to heat, bacterial action, and rotting. The braided Terylene sleeve or layer 1, therefore, serves to protect the nylon tube 2, particularly against tearing and against the effects of moisture which might cause the nylon to swell.

However, Terylene is not a light-stabilized material, and it may be subject to scuffing action. Therefore, in order to protect the Terylene layer against the effects of heat and light, the layer is encased in an outer extruded heat and light-stabilized sleeve 3. In the construction now being described, the outer sleeve is made from a superpolyamide material such as that polymerized from 11-amino undecanoic acid and known as "nylon 11." In addition to protecting the Terylene layer 1 against the effects of heat and light, the outer sleeve 3 also serves to protect the Terylene layer against damage which might otherwise occur when this form of composite tubular conduit is fitted with an end coupling of the types mentioned above. It also helps to secure the composite tubular conduit against any volumetric increase which might occur owing to the action of moisture.

As mentioned above, however, the outer extruded sleeve 3 may be made of neoprene and the heat and light-stabilizing process may be carried out either by adding a pigment to the plastic mix or by subjecting the extruded sleeve to a suitable heat treatment.

We claim:
1. A relatively flexible high strength composite tube comprising, an inner tube of nylon, said inner tube having a relatively small wall thickness as compared to the internal diameter of said inner tube, at least one layer of reinforcing filaments disposed in tensioned relation about said inner tube, said filaments being comprised of a poly (alkylene terephthalate) ester, and an outer sheath of nylon covering said reinforcing filaments, said composite tube possessing dimensional stability and considerable resistance to torsional fatigue.

2. A relatively flexible high strength composite tube comprising, an inner tube of nylon, said inner tube having a relatively small wall thickness as compared to the internal diameter of said inner tube, at least one layer of reinforcing filaments disposed in tensioned relation about said inner tube, said filaments being comprised of a poly (alkylene terephthalate) ester, and an outer sheath formed of nylon-like plastic material covering said reinforcing filaments, said composite tube possessing dimensional stability and considerable resistance to torsional fatigue.

References Cited in the file of this patent
UNITED STATES PATENTS

| | | |
|---|---|---|
| 2,034,654 | Greene | Mar. 17, 1936 |
| 2,381,739 | Gray | Aug. 7, 1945 |
| 2,512,433 | Leben | June 20, 1950 |
| 2,525,272 | Rhoton | Oct. 10, 1950 |
| 2,690,769 | Brown | Oct. 5, 1954 |
| 2,765,251 | Williams | Oct. 2, 1956 |
| 2,800,145 | Peierls et al. | July 23, 1957 |
| 2,833,313 | Penman | May 6, 1958 |
| 2,855,975 | Ritchie et al. | Oct. 14, 1958 |